(12) United States Patent
Lewis et al.

(10) Patent No.: US 12,498,181 B2
(45) Date of Patent: Dec. 16, 2025

(54) VAPOR CHAMBER

(71) Applicants: Kelvin Thermal Technologies, Inc., Boulder, CO (US); Murata Manufacturing Co., Ltd., Nagaokakyo (JP)

(72) Inventors: Ryan John Lewis, Boulder, CO (US); Takuo Wakaoka, Yasu (JP); Keijiro Kojima, Omihachiman (JP)

(73) Assignee: Kelvin Thermal Technologies, Inc., Boulder, CO (US)

( * ) Notice: Subject to any disclaimer, the term of this patent is extended or adjusted under 35 U.S.C. 154(b) by 0 days.

(21) Appl. No.: 16/710,180

(22) Filed: Dec. 11, 2019

(65) Prior Publication Data
US 2020/0182557 A1    Jun. 11, 2020

Related U.S. Application Data

(60) Provisional application No. 62/778,288, filed on Dec. 11, 2018.

(51) Int. Cl.
*F28D 15/04* (2006.01)
*B23P 15/26* (2006.01)

(52) U.S. Cl.
CPC ............ *F28D 15/046* (2013.01); *B23P 15/26* (2013.01)

(58) Field of Classification Search
CPC .... F28D 15/046; F28D 15/0233; B23P 15/26; F28F 2225/04; F28F 2240/00; G06F 1/203
See application file for complete search history.

(56) References Cited

U.S. PATENT DOCUMENTS

| | | |
|---|---|---|
| 4,000,776 A | 1/1977 | Kroebig et al. |
| 4,196,504 A | 4/1980 | Eastman |
| 4,274,479 A | 6/1981 | Eastman |
| 4,279,294 A | 7/1981 | Fitzpatrick et al. |
| 4,545,799 A | 10/1985 | Rhodes et al. |
| 4,854,379 A | 8/1989 | Shaubach et al. |
| 5,000,256 A | 3/1991 | Tousignant |

(Continued)

FOREIGN PATENT DOCUMENTS

| | | |
|---|---|---|
| CN | 2522409 Y | 11/2002 |
| CN | 2715467 Y | 8/2005 |

(Continued)

OTHER PUBLICATIONS

International Preliminary Report on Patentability dated May 14, 2019 as received in PCT Application No. PCT/US2017/060550, 7 pages.

(Continued)

*Primary Examiner* — Lawrence Averick

(57) ABSTRACT

To provide a vapor chamber having excellent function of circulating a working liquid from an end portion to a center portion of a wick and enabling the prevention of the occurrence of dry-out. A vapor chamber includes a casing formed of a first sheet and a second sheet which face each other and whose outer peripheries are bonded to each other; a working liquid sealed in the casing; and a wick disposed on an inner wall surface of the first sheet or the second sheet. A wall portion is disposed around the wick as viewed in a top plan view of an inside of the casing.

12 Claims, 6 Drawing Sheets

(56) References Cited

U.S. PATENT DOCUMENTS

| | | | |
|---|---|---|---|
| 5,157,893 A * | 10/1992 | Benson | E04C 2/34 |
| | | | 52/789.1 |
| 5,175,975 A * | 1/1993 | Benson | F01N 3/2882 |
| | | | 52/794.1 |
| 5,343,940 A | 9/1994 | Jean | |
| 5,360,058 A | 11/1994 | Koeppl et al. | |
| 5,560,423 A | 10/1996 | Koeppl et al. | |
| 5,735,339 A | 4/1998 | Davenport et al. | |
| 6,056,044 A | 5/2000 | Benson et al. | |
| 6,082,443 A | 7/2000 | Yamamoto et al. | |
| 6,139,974 A * | 10/2000 | Atkinson | F28F 13/00 |
| | | | 72/379.6 |
| 6,158,502 A | 12/2000 | Thomas | |
| 6,269,866 B1 * | 8/2001 | Yamamoto | F28D 15/0233 |
| | | | 174/15.2 |
| 6,446,706 B1 | 9/2002 | Rosenfeld et al. | |
| 6,533,029 B1 | 3/2003 | Phillips | |
| 6,561,262 B1 | 5/2003 | Osakabe et al. | |
| 6,763,671 B1 | 7/2004 | Klett et al. | |
| 6,896,039 B2 * | 5/2005 | Dussinger | B22F 3/11 |
| | | | 165/104.21 |
| 6,912,130 B2 | 6/2005 | Osanai et al. | |
| 6,938,481 B2 | 9/2005 | Paterek et al. | |
| 6,994,151 B2 | 2/2006 | Zhou et al. | |
| 7,028,713 B2 * | 4/2006 | Koyama | F16K 11/105 |
| | | | 137/881 |
| 7,037,400 B1 | 5/2006 | Zhou et al. | |
| 7,069,978 B2 | 7/2006 | Rosenfeld et al. | |
| 7,100,680 B2 * | 9/2006 | Dussinger | F28D 15/0233 |
| | | | 165/104.21 |
| 7,219,713 B2 | 5/2007 | Gelorme et al. | |
| 7,278,469 B2 | 10/2007 | Sasaki et al. | |
| 8,018,128 B2 | 9/2011 | Egawa et al. | |
| 8,069,907 B2 | 12/2011 | Bryant et al. | |
| 8,560,031 B2 | 10/2013 | Barnett et al. | |
| 8,579,018 B1 | 11/2013 | Roper et al. | |
| 8,646,281 B2 * | 2/2014 | Lim | H02S 40/425 |
| | | | 62/3.2 |
| 8,807,203 B2 | 8/2014 | MacDonald et al. | |
| 8,921,702 B1 | 12/2014 | Carter et al. | |
| 8,985,197 B2 * | 3/2015 | Wang | H01L 23/427 |
| | | | 165/170 |
| 9,127,898 B2 | 9/2015 | Wong | |
| 9,137,928 B2 | 9/2015 | Chen et al. | |
| 9,149,896 B1 | 10/2015 | Batty et al. | |
| 9,163,883 B2 | 10/2015 | Yang et al. | |
| 9,597,657 B1 | 3/2017 | Zhamu et al. | |
| 9,600,041 B2 | 3/2017 | Ady et al. | |
| 9,651,312 B2 | 5/2017 | Yang et al. | |
| 9,700,930 B2 * | 7/2017 | Yang | B21D 53/02 |
| 9,835,383 B1 | 12/2017 | Roper et al. | |
| 9,909,814 B2 | 3/2018 | Yang et al. | |
| 9,921,004 B2 | 3/2018 | Lewis et al. | |
| 10,066,876 B2 | 9/2018 | Zhou et al. | |
| 10,281,220 B1 | 5/2019 | Lin et al. | |
| 10,458,719 B2 | 10/2019 | Bozorgi et al. | |
| 10,527,358 B2 | 1/2020 | Yang et al. | |
| 10,544,994 B2 * | 1/2020 | Wakaoka | F28D 15/0233 |
| 10,571,200 B2 | 2/2020 | Yang et al. | |
| 10,973,151 B2 * | 4/2021 | Wakaoka | F28D 15/046 |
| 10,980,148 B2 | 4/2021 | Cheng | |
| 11,054,189 B2 | 7/2021 | Salim Shirazy et al. | |
| 11,054,190 B2 * | 7/2021 | Inagaki | F28F 1/30 |
| 11,058,031 B2 * | 7/2021 | Numoto | F28D 15/04 |
| 11,060,799 B1 | 7/2021 | Lin | |
| 11,150,030 B2 * | 10/2021 | Kishimoto | F28D 15/0233 |
| 11,445,636 B2 | 9/2022 | Wakaoka et al. | |
| 11,598,594 B2 | 3/2023 | Lewis et al. | |
| 11,930,621 B2 | 3/2024 | Lewis et al. | |
| 2001/0054495 A1 | 12/2001 | Yevin et al. | |
| 2003/0042009 A1 | 3/2003 | Phillips | |
| 2003/0051859 A1 | 3/2003 | Chesser et al. | |
| 2003/0079863 A1 | 5/2003 | Sugito et al. | |
| 2003/0102118 A1 | 6/2003 | Sugito et al. | |
| 2003/0136547 A1 | 7/2003 | Gollan et al. | |
| 2003/0136550 A1 | 7/2003 | Tung et al. | |
| 2003/0136551 A1 | 7/2003 | Bakke | |
| 2003/0159806 A1 * | 8/2003 | Sehmbey | F28F 3/027 |
| | | | 165/80.3 |
| 2004/0011509 A1 | 1/2004 | Siu | |
| 2004/0050533 A1 * | 3/2004 | Chesser | G06F 1/20 |
| | | | 165/46 |
| 2004/0131877 A1 | 7/2004 | Hasz et al. | |
| 2004/0134548 A1 * | 7/2004 | Koyama | F16K 11/105 |
| | | | 137/881 |
| 2004/0211549 A1 | 10/2004 | Garner et al. | |
| 2004/0244951 A1 * | 12/2004 | Dussinger | B22F 3/11 |
| | | | 165/104.26 |
| 2005/0059238 A1 | 3/2005 | Chen et al. | |
| 2005/0126757 A1 | 6/2005 | Bennett et al. | |
| 2005/0190810 A1 | 9/2005 | Butterworth et al. | |
| 2005/0230085 A1 | 10/2005 | Valenzuela | |
| 2005/0280128 A1 | 12/2005 | Mok et al. | |
| 2005/0280162 A1 | 12/2005 | Mok et al. | |
| 2006/0032615 A1 * | 2/2006 | Dussinger | F28D 15/0233 |
| | | | 165/104.26 |
| 2006/0037737 A1 | 2/2006 | Chen et al. | |
| 2006/0090882 A1 | 5/2006 | Sauciuc | |
| 2006/0098411 A1 | 5/2006 | Lee et al. | |
| 2006/0124280 A1 * | 6/2006 | Lee | F28D 15/0233 |
| | | | 165/104.26 |
| 2006/0131002 A1 | 6/2006 | Mochizuki et al. | |
| 2006/0162905 A1 | 7/2006 | Hsu | |
| 2006/0196640 A1 | 9/2006 | Siu | |
| 2006/0196641 A1 | 9/2006 | Hong et al. | |
| 2006/0213648 A1 | 9/2006 | Chen et al. | |
| 2006/0283574 A1 | 12/2006 | Huang | |
| 2006/0283576 A1 | 12/2006 | Lai et al. | |
| 2007/0006993 A1 | 1/2007 | Meng et al. | |
| 2007/0035927 A1 | 2/2007 | Erturk et al. | |
| 2007/0056714 A1 | 3/2007 | Wong | |
| 2007/0068657 A1 * | 3/2007 | Yamamoto | H01L 23/427 |
| | | | 165/80.4 |
| 2007/0077165 A1 | 4/2007 | Hou et al. | |
| 2007/0089864 A1 | 4/2007 | Chang et al. | |
| 2007/0095507 A1 | 5/2007 | Henderson et al. | |
| 2007/0107875 A1 | 5/2007 | Lee et al. | |
| 2007/0107878 A1 | 5/2007 | Hou et al. | |
| 2007/0158050 A1 | 7/2007 | Norley et al. | |
| 2008/0017356 A1 | 1/2008 | Gruss et al. | |
| 2008/0029249 A1 | 2/2008 | Hsiao | |
| 2008/0067502 A1 | 3/2008 | Chakrapani et al. | |
| 2008/0111151 A1 | 5/2008 | Teraki et al. | |
| 2008/0128116 A1 | 6/2008 | Dangelo et al. | |
| 2008/0128898 A1 | 6/2008 | Henderson et al. | |
| 2008/0210407 A1 * | 9/2008 | Kim | F28D 15/046 |
| | | | 29/890.039 |
| 2008/0224303 A1 | 9/2008 | Funakoshi et al. | |
| 2008/0272482 A1 | 11/2008 | Jensen et al. | |
| 2008/0283222 A1 | 11/2008 | Chang et al. | |
| 2009/0020269 A1 | 1/2009 | Chang et al. | |
| 2009/0020272 A1 | 1/2009 | Shimizu | |
| 2009/0025910 A1 | 1/2009 | Hoffman et al. | |
| 2009/0056917 A1 | 3/2009 | Majumdar et al. | |
| 2009/0151906 A1 | 6/2009 | Lai et al. | |
| 2009/0159242 A1 | 6/2009 | Zhao et al. | |
| 2009/0205812 A1 * | 8/2009 | Meyer, IV | F28D 15/046 |
| | | | 165/104.26 |
| 2009/0236080 A1 | 9/2009 | Lin et al. | |
| 2009/0294104 A1 | 12/2009 | Lin et al. | |
| 2009/0316335 A1 | 12/2009 | Simon et al. | |
| 2010/0028604 A1 | 2/2010 | Bhushan et al. | |
| 2010/0053899 A1 | 3/2010 | Hashimoto et al. | |
| 2010/0071879 A1 | 3/2010 | Hou | |
| 2010/0084113 A1 | 4/2010 | Lee | |
| 2010/0139767 A1 | 6/2010 | Hsieh et al. | |
| 2010/0157535 A1 | 6/2010 | Oniki et al. | |
| 2010/0175854 A1 | 7/2010 | Gratton | |
| 2010/0200199 A1 | 8/2010 | Oniki et al. | |
| 2010/0252237 A1 | 10/2010 | Hashimoto et al. | |
| 2010/0254090 A1 | 10/2010 | Trautman | |
| 2010/0290190 A1 | 11/2010 | Chester et al. | |

(56) References Cited

U.S. PATENT DOCUMENTS

| | | |
|---|---|---|
| 2010/0294200 A1 | 11/2010 | Zhang et al. |
| 2010/0300656 A1 | 12/2010 | Lu et al. |
| 2011/0017431 A1 | 1/2011 | Yang et al. |
| 2011/0027311 A1 | 2/2011 | Deng et al. |
| 2011/0083829 A1 | 4/2011 | Hung et al. |
| 2011/0088873 A1 | 4/2011 | Yang |
| 2011/0108142 A1 | 5/2011 | Liu et al. |
| 2011/0120674 A1 | 5/2011 | MacDonald et al. |
| 2011/0174474 A1* | 7/2011 | Liu .................. C23C 28/30 165/185 |
| 2011/0198059 A1 | 8/2011 | Gavillet et al. |
| 2011/0205708 A1 | 8/2011 | Andry et al. |
| 2012/0037210 A1* | 2/2012 | Lim .................. F28F 3/02 136/246 |
| 2012/0048516 A1 | 3/2012 | He et al. |
| 2012/0061127 A1 | 3/2012 | Fields et al. |
| 2012/0168435 A1 | 7/2012 | Chen et al. |
| 2012/0186784 A1 | 7/2012 | Yang et al. |
| 2012/0189839 A1 | 7/2012 | Aoki et al. |
| 2012/0241216 A1 | 9/2012 | Coppeta et al. |
| 2012/0312504 A1 | 12/2012 | Suzuki et al. |
| 2012/0325437 A1 | 12/2012 | Meyer, Iv et al. |
| 2013/0014919 A1 | 1/2013 | Dai et al. |
| 2013/0043000 A1* | 2/2013 | Wang .................. F28D 15/0233 165/67 |
| 2013/0049018 A1 | 2/2013 | Ramer et al. |
| 2013/0168057 A1 | 7/2013 | Semenic et al. |
| 2013/0199770 A1 | 8/2013 | Cherian |
| 2013/0269913 A1 | 10/2013 | Ueda et al. |
| 2013/0327504 A1 | 12/2013 | Bozorgi et al. |
| 2014/0009883 A1 | 1/2014 | Bozorgi et al. |
| 2014/0017456 A1 | 1/2014 | Xiao et al. |
| 2014/0055954 A1 | 2/2014 | Wu |
| 2014/0174700 A1 | 6/2014 | Lin et al. |
| 2014/0174701 A1 | 6/2014 | Kare et al. |
| 2014/0237823 A1* | 8/2014 | Yang .................. H01L 23/427 29/890.039 |
| 2014/0238645 A1 | 8/2014 | Enright |
| 2014/0238646 A1 | 8/2014 | Enright |
| 2014/0247556 A1 | 9/2014 | Eid et al. |
| 2015/0000884 A1 | 1/2015 | Jiang et al. |
| 2015/0181756 A1 | 6/2015 | Eid et al. |
| 2015/0226493 A1 | 8/2015 | Yang et al. |
| 2015/0237762 A1 | 8/2015 | Holt et al. |
| 2015/0289413 A1 | 10/2015 | Rush et al. |
| 2016/0018165 A1 | 1/2016 | Ahamed et al. |
| 2016/0076820 A1 | 3/2016 | Lewis et al. |
| 2016/0081227 A1 | 3/2016 | Lewis et al. |
| 2016/0123678 A1 | 5/2016 | Hulse et al. |
| 2016/0131437 A1 | 5/2016 | Wu |
| 2016/0161193 A1 | 6/2016 | Lewis et al. |
| 2016/0216042 A1 | 7/2016 | Bozorgi et al. |
| 2016/0252308 A1 | 9/2016 | Strehlow |
| 2016/0295980 A1 | 10/2016 | Wu |
| 2016/0343639 A1 | 11/2016 | Groothuis et al. |
| 2017/0030654 A1 | 2/2017 | Yang et al. |
| 2017/0064868 A1 | 3/2017 | Rush et al. |
| 2017/0122672 A1 | 5/2017 | Lin |
| 2017/0241717 A1 | 8/2017 | Sun et al. |
| 2017/0292793 A1 | 10/2017 | Sun et al. |
| 2017/0318702 A1 | 11/2017 | Basu et al. |
| 2017/0343293 A1 | 11/2017 | Hurbi et al. |
| 2017/0350657 A1 | 12/2017 | Yeh et al. |
| 2018/0010861 A1* | 1/2018 | Wakaoka .......... H01L 23/427 |
| 2018/0106554 A1 | 4/2018 | Lewis et al. |
| 2018/0320984 A1 | 11/2018 | Lewis |
| 2018/0320985 A1 | 11/2018 | Salim Shirazy et al. |
| 2019/0271511 A1* | 9/2019 | Kishimoto .......... F28D 15/0233 |
| 2019/0323780 A1 | 10/2019 | Ahamed et al. |
| 2019/0390919 A1 | 12/2019 | Lewis et al. |
| 2020/0003501 A1* | 1/2020 | Wakaoka .......... H05K 7/20 |
| 2020/0045847 A1* | 2/2020 | Wakaoka .......... F28D 15/046 |
| 2020/0045848 A1* | 2/2020 | Wakaoka .......... F28F 21/08 |
| 2020/0049421 A1* | 2/2020 | Wakaoka .......... F28F 3/02 |
| 2020/0060044 A1* | 2/2020 | Numoto .......... F28D 15/0233 |
| 2020/0124352 A1* | 4/2020 | Wakaoka .......... F28D 15/0233 |
| 2020/0240718 A1* | 7/2020 | Wakaoka .......... F28D 15/046 |
| 2021/0025061 A1 | 1/2021 | Yang et al. |
| 2021/0136955 A1* | 5/2021 | Wakaoka .......... H05K 7/20336 |
| 2021/0148646 A1 | 5/2021 | Sun et al. |
| 2021/0293488 A1 | 9/2021 | Lewis et al. |
| 2021/0400846 A1 | 12/2021 | Lewis et al. |
| 2022/0120510 A1 | 4/2022 | Wu et al. |
| 2022/0128314 A1 | 4/2022 | Inagaki et al. |
| 2022/0294485 A1 | 9/2022 | Li et al. |
| 2023/0017904 A1 | 1/2023 | Lai et al. |

FOREIGN PATENT DOCUMENTS

| | | |
|---|---|---|
| CN | 1672258 A | 9/2005 |
| CN | 1877241 A | 12/2006 |
| CN | 1957221 A | 5/2007 |
| CN | 101022718 A | 8/2007 |
| CN | 101080359 A | 11/2007 |
| CN | 101151950 A | 3/2008 |
| CN | 100480611 C | 4/2009 |
| CN | 100508708 C | 7/2009 |
| CN | 101754656 A | 6/2010 |
| CN | 102019543 A | 4/2011 |
| CN | 102066864 A | 5/2011 |
| CN | 202928418 U | 5/2013 |
| CN | 103398613 A | 11/2013 |
| CN | 103952729 A | 7/2014 |
| CN | 209930339 U | 1/2020 |
| DE | 19729922 C1 | 1/1999 |
| DE | 202009106739 U1 | 4/2010 |
| EP | 1369918 A2 | 12/2003 |
| EP | 1379825 A2 | 1/2004 |
| EP | 2713132 A1 | 4/2014 |
| GB | 2529512 A | 2/2016 |
| JP | H1197871 A | 4/1999 |
| JP | 2011080679 A | 4/2011 |
| JP | 2013148289 A | 8/2013 |
| JP | 2018204941 A | 12/2018 |
| JP | 2019016883 A | 1/2019 |
| TW | M544733 U | 7/2017 |
| WO | 03103835 A1 | 12/2003 |
| WO | 2006052763 A2 | 5/2006 |
| WO | 2006115326 A1 | 11/2006 |
| WO | 2006123049 A2 | 11/2006 |
| WO | 2007124028 A2 | 11/2007 |
| WO | 2008044823 A1 | 4/2008 |
| WO | 2008045004 A1 | 4/2008 |
| WO | 2008146129 A2 | 12/2008 |
| WO | 2009079084 A1 | 6/2009 |
| WO | 2010036442 A1 | 4/2010 |
| WO | 2013144444 A1 | 10/2013 |
| WO | 2015172136 A1 | 11/2015 |
| WO | 2015193153 A1 | 12/2015 |
| WO | 2016044180 A1 | 3/2016 |

OTHER PUBLICATIONS

Final Office Action dated May 28, 2019 in U.S. Appl. No. 15/436,632, 14 pages.

Advisory Action dated Jul. 19, 2019 in U.S. Appl. No. 15/292,932, 4 pages.

Advisory Action dated Aug. 22, 2019 in U.S. Appl. No. 15/787,455, 4 pages.

Final Office Action dated Aug. 26, 2019 in U.S. Appl. No. 14/857,567, 27 pages.

Notice of Allowance dated Sep. 12, 2019 in U.S. Appl. No. 15/292,932, 7 pages.

Non-Final Office Action dated Sep. 17, 2019 in U.S. Appl. No. 15/787,455, 20 pages.

Notice of Allowance dated Oct. 10, 2019 in U.S. Appl. No. 15/436,632, 10 pages.

Final Office Action dated Oct. 11, 2019 in U.S. Appl. No. 15/806,723, 18 pages.

Advisory Action dated Nov. 7, 2019 in U.S. Appl. No. 14/857,567, 7 pages.

(56) References Cited

OTHER PUBLICATIONS

International Preliminary Report on Patentability dated Nov. 12, 2019 received in PCT Application No. PCT/US2018/031632, 7 pages.
Non-Final Office Action dated Nov. 29, 2019 in U.S. Appl. No. 14/857,567, 32 pages.
Advisory Action dated Feb. 3, 2020 in U.S. Appl. No. 15/806,723, 5 pages.
Restriction Requirement dated Feb. 13, 2020 in U.S. Appl. No. 15/974,306, 5 pages.
Final Office Action dated Feb. 18, 2020 in U.S. Appl. No. 15/787,455, 17 pages.
Office Action mailed Feb. 18, 2020, as received in EP Application No. 15841403.7, 4 pages.
Non-Final Office Action dated Mar. 18, 2020 in U.S. Appl. No. 15/806,723, 6 pages.
Office Action mailed Apr. 9, 2020, as received in EP Application No. 15842101.6, 7 pages.
Notice of Allowance dated Apr. 15, 2020 in U.S. Appl. No. 14/857,567, 13 pages.
Notice of Allowance dated Apr. 20, 2020 in U.S. Appl. No. 15/806,723, 8 pages.
Advisory Action dated May 1, 2020 in U.S. Appl. No. 15/787,455, 4 pages.
Non-Final Office Action dated May 29, 2020 in U.S. Appl. No. 15/974,306, 11 pages.
First Office Action received Jun. 1, 2020, in related CN application No. 201910233277.1, 18 Pages.
First Office Action mailed Jun. 4, 2020, as received in CN Application No. 201580050472, 15 pages.
Extended European search report Application mailed Jun. 12, 2020, as received in EP Application No. 17870153.8, 9 pages.
International Search Report and Written Opinion Application mailed Jul. 13, 2020, as received in PCT Application No. PCT/US2020/030911, 9 pages.
First Office Action mailed Jul. 24, 2020, as received in CN Application No. 201910754250, 19 pages.
First Office Action mailed Sep. 24, 2020, as received in CN Application No. 201880030856, 19 pages.
Restriction Requirement dated Oct. 14, 2020 in U.S. Appl. No. 16/539,848, 8 pages.
Non-Final Office Action dated Oct. 26, 2020 in U.S. Appl. No. 16/539,848, 13 pages.
Office Action mailed Nov. 18, 2020, as received in EP Application No. 15841403.7, 5 pages.
Office Action mailed Nov. 17, 2020, as received in EP Application No. 15842101.6, 5 pages.
Extended European search report Application mailed Dec. 16, 2020, as received in EP Application No. 18798835.7, 8 pages.
Final Office Action dated Jan. 11, 2021 in U.S. Appl. No. 15/974,306, 12 pages.
Final Office Action dated Feb. 2, 2021 in U.S. Appl. No. 16/539,848, 10 pages.
Second Office Action mailed Mar. 16, 2021, as received in CN Application No. 201910233277.1, 21 pages.
Advisory Action dated Apr. 9, 2021 in U.S. Appl. No. 16/539,848, 4 pages.
Advisory Action dated Apr. 16, 2021 in U.S. Appl. No. 15/974,306, 4 pages.
Third Office Action mailed Apr. 19, 2021, as received in CN Application No. 201580049534, 7 pages.
Non-Final Office Action dated May 11, 2021 in U.S. Appl. No. 16/539,848, 10 pages.
Non-Final Office Action dated May 17, 2021 in U.S. Appl. No. 15/974,306, 9 pages.
International Preliminary Report on Patentability dated Jun. 8, 2021 as received in PCT Application No. PCT/US2019/065701, 7 pages.
Restriction Requirement dated Jun. 9, 2021 in U.S. Appl. No. 16/680,480, 6 pages.
Non-Final Office Action dated Jul. 9, 2021 in U.S. Appl. No. 15/930,016, 18 pages.
Restriction Requirement dated Aug. 30, 2021 in U.S. Appl. No. 17/352,250, 7 pages.
Notice of Allowance dated Sep. 9, 2021 in U.S. Appl. No. 15/787,455, 8 pages.
Restriction Requirement dated Jul. 23, 2012 in U.S. Appl. No. 12/719,775, 9 pages.
Non-Final Office Action dated Nov. 9, 2012 in U.S. Appl. No. 12/719,775, 15 pages.
Final Office Action dated May 9, 2013 in U.S. Appl. No. 12/719,775, 15 pages.
Advisory Action dated Aug. 2, 2013 in U.S. Appl. No. 12/719,775, 4 pages.
Non-Final Office Action dated Oct. 2, 2013 in U.S. Appl. No. 12/719,775, 17 pages.
Final Office Action dated Mar. 26, 2014 in U.S. Appl. No. 12/719,775, 23 pages.
Advisory Action dated Jun. 20, 2014 in U.S. Appl. No. 12/719,775, 4 pages.
Non-Final Office Action dated Feb. 6, 2015 in U.S. Appl. No. 12/719,775, 24 pages.
Restriction Requirement dated Jul. 28, 2015 in U.S. Appl. No. 14/681,624, 5 pages.
Notice of Allowance in dated Aug. 4, 2015 U.S. Appl. No. 12/719,775, 9 pages.
Non-Final Office Action dated Oct. 23, 2015 in U.S. Appl. No. 14/681,624, 11 pages.
International Search Report and Written Opinion dated Dec. 18, 2015 as received in PCT Application No. PCT/US2015/050031, 13 pages.
International Search Report and Written Opinion dated Dec. 18, 2015 as received in PCT Application No. PCT/US2015/050771, 13 pages.
Final Office Action dated May 5, 2016 in U.S. Appl. No. 14/681,624, 11 pages.
International Search Report and Written Opinion mailed dated Jul. 15, 2016 as received in PCT Application No. PCT/US2015/057885, 10 pages.
Notice of Allowance dated Nov. 17, 2016 in U.S. Appl. No. 14/681,624, 7 pages.
International Preliminary Report on Patentability dated Mar. 21, 2017 as received in PCT Application No. PCT/US2015/050031, 8 pages.
International Preliminary Report on Patentability dated Mar. 21, 2017 as received in PCT Application No. PCT/US2015/050771, 6 pages.
International Preliminary Report on Patentability dated May 2, 2017 as received in PCT Application No. PCT/US2015/057885, 5 pages.
Preinterview First Office Action dated May 9, 2017 in U.S. Appl. No. 14/861,708, 9 pages.
Non-Final Office Action dated Aug. 9, 2017 in U.S. Appl. No. 14/925,787, 16 pages.
Restriction Requirement dated Aug. 30, 2017 in U.S. Appl. No. 14/853,833, 7 pages.
Final Office Action dated Sep. 28, 2017 in U.S. Appl. No. 14/925,787, 9 pages.
Non-Final Office Action dated Oct. 6, 2017 in U.S. Appl. No. 14/853,833, 13 pages.
Notice of Allowance dated Oct. 25, 2017 in U.S. Appl. No. 14/861,708, 9 pages.
US Notice of Allowance dated Nov. 9, 2017 in U.S. Appl. No. 14/925,787, 7 pages.
Preinterview First Office Action dated Nov. 21, 2017 in U.S. Appl. No. 14/857,567, 12 pages.
International Search Report and Written Opinion mailed dated Jan. 17, 2018 as received in PCT Application No. PCT/US2017/060550, 13 pages.
Extended European search report Application mailed Feb. 22, 2018, as received in EP Application No. 15842101.6, 7 pages.
Final Office Action dated Mar. 8, 2018 in U.S. Appl. No. 14/857,567, 25 pages.

(56) References Cited

OTHER PUBLICATIONS

Extended European search report mailed Mar. 26, 2018, as received in EP Application No. 15841403.7, 10 pages.
Final Office Action dated Apr. 25, 2018 in U.S. Appl. No. 14/853,833, 12 pages.
First Office Action mailed May 9, 2018, as received in CN Application No. 201580049534, 13 pages.
Advisory Action dated May 30, 2018 in U.S. Appl. No. 14/857,567, 7 pages.
Non-Final Office Action dated Aug. 2, 2018 in U.S. Appl. No. 14/857,567, 30 pages.
First Office Action mailed Aug. 28, 2018, as received in CN Application No. 201580059333, 10 pages.
Restriction Requirement dated Aug. 30, 2018 in U.S. Appl. No. 15/292,932, 5 pages.
Non-Final Office Action dated Sep. 27, 2018 in U.S. Appl. No. 15/787,455, 15 pages.
Restriction Requirement dated Oct. 10, 2018 in U.S. Appl. No. 15/436,632, 5 pages.
International Search Report and Written Opinion mailed dated Oct. 15, 2018 received in PCT Application No. PCT/US2018/031632, 15 pages.
Final Office Action dated Oct. 30, 2018 in U.S. Appl. No. 14/857,567, 28 pages.
Non-Final Office Action dated Nov. 19, 2018 in U.S. Appl. No. 14/853,833, 11 pages.
Non-Final Office Action dated Dec. 11, 2018 in U.S. Appl. No. 15/292,932, 13 pages.
Second Office Action mailed Dec. 29, 2018, as received in CN Application No. 201580049534, 14 pages.
Non-Final Office Action dated Feb. 5, 2019 in U.S. Appl. No. 15/436,632, 10 pages.
Non-Final Office Action dated Mar. 21, 2019 in U.S. Appl. No. 14/857,567, 28 pages.
Final Office Action dated Mar. 29, 2019 in U.S. Appl. No. 14/853,833, 12 pages.
Final Office Action dated Mar. 29, 2019 in U.S. Appl. No. 15/292,932, 13 pages.
Final Office Action dated Apr. 1, 2019 in U.S. Appl. No. 15/787,455, 20 pages.
Non-Final Office Action dated Apr. 5, 2019 in U.S. Appl. No. 15/806,723, 12 pages.
International Search Report and Written Opinion as issued in connection with International Patent Application No. PCT/US19/65701, mailed Apr. 8, 2020, 10 pages.
Non-Final Office Action dated Oct. 5, 2021 in U.S. Appl. No. 16/680,480, 12 pages.
China Office Action in CN Application No. 201780082663.4 dated Sep. 20, 2022, 22 pages.
Non-Final Office Action in U.S. Appl. No. 17/529,248 mailed on Dec. 22, 2022, 9 pages.
Non-Final Office Action in U.S. Appl. No. 16/864,236 dated Oct. 6, 2022, 11 pages.
Advisory Action in U.S. Appl. No. 16/539,848 dated Nov. 28, 2022, 3 pages.
Final Office Action in U.S. Appl. No. 16/539,848 dated Sep. 13, 2022, 11 pages.
Non-Final Office Action in U.S. Appl. No. 16/539,848 dated Dec. 29, 2022, 12 pages.
Non-Final Office Action in U.S. Appl. No. 15/930,016 dated Jul. 27, 2022, 16 pages.
Notice of Allowance in U.S. Appl. No. 15/930,016 dated Dec. 1, 2022, 9 pages.
Final Office Action dated May 17, 2023 in U.S. Appl. No. 16/539,848, 10 pages.
Final Office Action in U.S. Appl. No. 16/864,236 mailed on Apr. 10, 2023, 11 pages.
Final Office Action in U.S. Appl. No. 17/529,248 mailed on Apr. 25, 2023, 7 pages.
Restriction Requirement dated Apr. 20, 2023 in U.S. Appl. No. 17/666,537, 6 pages.
Non-Final Office Action in U.S. Appl. No. 17/666,537 dated Aug. 1, 2023, 10 pages.
Non-Final Office Action in U.S. Appl. No. 16/864,236 dated Nov. 29, 2023, 11 pages.
Notice of Allowance in U.S. Appl. No. 17/666,537 dated Feb. 15, 2024, 9 pages.
Restriction Requirement in U.S. Appl. No. 17/592,490 dated Jun. 10, 2024, 8 pages.
Non-Final Office Action in U.S. Appl. No. 17/592,490 dated Nov. 19, 2024, 17 pages.
Final Office Action in U.S. Appl. No. 16/864,236 mailed on Jun. 7, 2024, 11 pages.
Non-Final Office Action in U.S. Appl. No. 16/864,236 mailed on Dec. 20, 2024, 13 pages.
International Search Report and Written Opinion in PCT Application No. PCT/US2024/027116 mailed on Sep. 4, 2024, 12 pages.
Junjiao, H., et al., "Development of heat pipe cooling technology in high heat flux electronic components", Chemical Industry and Engineering Progress, Chemical Industry and Engineering Progress, vol. 34, Issue. 5, pp. 1220-1231 (May 5, 2015).
Restriction Requirement in U.S. Appl. No. 18/666,811 dated Dec. 5, 2024, 5 pages.
Non-Final Office Action in U.S. Appl. No. 17/951,075 mailed on Jun. 4, 2024, 21 pages.
Final Office Action in U.S. Appl. No. 17/951,075 mailed on Nov. 20, 2024, 20 pages.
Restriction Requirement in U.S. Appl. No. 18/004,059 dated May 2, 2024, 7 pages.
Restriction Requirement in U.S. Appl. No. 18/004,059 dated Sep. 30, 2024, 7 pages.
Non-Final Office Action in U.S. Appl. No. 18/180,122 mailed on Nov. 15, 2024, 17 pages.
International Search Report and Written Opinion in PCT Application No. PCT/US2024/038965 mailed on Oct. 30, 2024, 11 pages.
Non-Final Office Action in U.S. Appl. No. 17/951,075 mailed on Mar. 4, 2025, 21 pages.
Non-Final Office Action in U.S. Appl. No. 18/004,059 mailed on Mar. 31, 2025, 10 pages.
Non-Final Office Action in U.S. Appl. No. 18/666,811 mailed on Apr. 8, 2025, 8 pages.
Notice of Allowance in U.S. Appl. No. 18/180,122 mailed on May 12, 2025, 10 pages.
Non-Final Office Action in U.S. Appl. No. 17/592,490 mailed on May 19, 2025, 12 pages.
Non-Final Office Action in U.S. Appl. No. 16/539,848 mailed on Jun. 20, 2025, 11 pages.
International Search Report and Written Opinion in PCT Application No. PCT/US2021/038152 mailed on Sep. 29, 2021, 14 pages.
Final Office Action in U.S. Appl. No. 16/864,236 mailed on Jul. 28, 2025, 12 pages.
Notice of Allowance in U.S. Appl. No. 17/529,248 mailed on Aug. 18, 2025, 7 pages.
Notice of Allowance in U.S. Appl. No. 18/004,059 mailed on Aug. 21, 2025, 5 pages.
Non-Final Office Action in U.S. Appl. No. 17/592,490 mailed on Aug. 26, 2025, 13 pages.
Non-Final Office Action dated Nov. 5, 2021 in U.S. Appl. No. 17/352,250, 17 pages.
Non-Final Office Action dated Nov. 8, 2021 in U.S. Appl. No. 15/787,455, 17 pages.
Final Office Action dated Nov. 29, 2021 in U.S. Appl. No. 16/539,848, 11 pages.
Final Office Action dated Dec. 17, 2021 in U.S. Appl. No. 15/930,016, 19 pages.
Restriction Requirement in U.S. Appl. No. 16/864,236 dated Feb. 7, 2022, 8 pages.
Advisory Action dated Feb. 9, 2022 in U.S. Appl. No. 16/539,848, 4 pages.
Final Office Action dated Feb. 24, 2022 in U.S. Appl. No. 15/787,455, 24 pages.

(56) References Cited

OTHER PUBLICATIONS

Notice of Allowance dated Feb. 28, 2022 in U.S. Appl. No. 16/680,480, 9 pages.
Final Office Action dated Mar. 11, 2022 in U.S. Appl. No. 17/352,250, 17 pages.
Non-Final Office Action dated Mar. 28, 2022 in U.S. Appl. No. 16/539,848, 11 pages.

* cited by examiner

VAPOR CHAMBER

FIELD

This disclosure relates generally to thermal ground planes.

BACKGROUND

Recently, along with a realization of higher integration and higher performance of electronic devices, a heating value is increased. Further, along with miniaturization of products, heat generation density is increased and hence, a measure to cope with radiation of heat becomes important. Such a circumstance is more conspicuous in a mobile terminal such as a smartphone or a tablet, and heat designing has become extremely difficult. Although a graphite sheet or the like is used as a member for coping with heat, a heat transfer amount of the graphite sheet or the like is not sufficient.

As a member for coping with heat having high heat transfer ability, a vapor chamber which is a planar heat pipe is named. The vapor chamber exhibits excellent apparent thermal conductivity as a whole which is approximately several times to several tens of times as large as apparent thermal conductivity of metal such as copper or aluminum.

As a member for coping with heat which uses a vapor chamber, for example, Patent Document 1 discloses a sheet type member for coping with heat where a wick, a nonwoven fabric, and a working liquid are sealed in a sheet like casing formed by bonding metal sheets.

SUMMARY

Some embodiments include a vapor chamber comprising a casing having: a first sheet having a first inner wall surface, and a second sheet having a second inner wall surface, the first inner wall surface of the first sheet and the second inner wall surface of the second sheet face each other, and outer peripheries of the first sheet and the second sheet are bonded to each other. The vapor core may also include a working liquid sealed in the casing; a wick disposed on the first inner wall surface of the first sheet; and a wall portion disposed around the wick on the first inner wall surface of the first sheet.

In some embodiments, the wall portion is disposed around the wick as viewed in a top plan view of an inside of the casing.

In some embodiments, a shape of an upper surface of the wall portion is a shape which conforms to a shape of the second inner wall surface of the second sheet at a portion of the second sheet which faces the wall portion.

In some embodiments, the wick is formed of a plurality of columnar protruding portions, and a mesh disposed on the protruding portions. In some embodiments, the mesh is disposed on an upper surface of the wall portion. In some embodiments, the mesh comprises a material with a high capillary action. In some embodiments, the mesh comprises a porous material or a nonwoven fabric. In some embodiments, the protruding portions have a height of 1 µm or more to 100 µm or less. In some embodiments, the mesh includes an aperture size of 0.10 µm to 50 µm.

In some embodiments, the working liquid comprises water or alcohol or an alternative fluorocarbon.

In some embodiments, the vapor chamber may include a plurality of support columns disposed on the second inner wall surface of the second sheet. In some embodiments, the vapor chamber may include a cavity disposed between the wick and the second sheet.

In some embodiments, the first sheet or the second sheet has a thicknesses of 200 µm or less.

A method is disclosed that may include placing a plating resist on a sheet with a first pattern with a first plurality of gaps; applying a plating to the sheet that fills in the first plurality of gaps in the first pattern; removing the plating resist; placing an etching resist on the sheet with a second pattern with a second plurality of gaps; etching the sheet to remove portions of the sheet corresponding with the second plurality of gaps; and removing the etching resist.

In some embodiments, the plating resist is placed on the sheet using printing or exposure-development. In some embodiments, the sheet and the plating resist comprise different materials. In some embodiments, the etching forms a plurality of protruding portions and wall portions on the sheet.

In some embodiments, the method may include performing back surface polishing. In some embodiments the method may include sealing a periphery of the sheet with a periphery of a second sheet.

In some embodiments, the working liquid sealed in the casing is, when the inside of the casing is viewed from an upper surface of the casing, vaporized at a center portion of the wick, and liquefied at end portions (outer peripheral portions) of the wick.

Then, the working liquid liquefied at the end portions of the wick is moved toward a center portion of the wick due to capillarity and hence, it is possible to acquire a heat transfer effect.

The above-mentioned mechanism is realized on the premise that the working liquid liquefied at the end portion of the wick flows toward the center portion of the wick. However, at a point slightly more inside than the end portion of the wick, there has been a case where the working liquid does not flow toward the center portion of the wick but flows toward the end portion of the wick (reverse flow).

When the working liquid flows reversely, vaporization of the working liquid occurs at the end portion of the wick or outside the wick and hence, the working liquid stagnates on a periphery of the end portion of the wick.

When such stagnation of the working liquid occurs, the working liquid is no longer supplied to the center portion of the wick and hence, there has been a case where the center portion of the wick becomes dried out so that a phenomenon referred to as "dry-out" occurs.

When the dry-out occurs, vaporization of the working liquid does not occur at the center portion of the wick close to a heat source and hence, heat from the heat source cannot be absorbed. In this case, a temperature of the heat source is not lowered and hence, there is a concern that an electronic part such as a CPU becomes defective due to thermal runaway of the electronic part, and a surface temperature of a mobile terminal becomes higher than an estimated temperature.

The present invention has been made in view of the above-mentioned circumstances, and it is an object of the present invention to provide a vapor chamber having an excellent function of circulating a working liquid from an end portion to a center portion of a wick thus enabling the prevention of the occurrence of dry-out.

A vapor chamber as described in various embodiments of the invention includes a casing formed of a first sheet and a second sheet which face each other and whose outer peripheries are bonded to each other; a working liquid sealed in the casing; and a wick disposed on an inner wall surface of the first sheet or the second sheet, wherein a wall portion is disposed around the wick as viewed in a top plan view of an inside of the casing.

According to some embodiments of the invention, it is possible to provide the vapor chamber having an excellent function of circulating the working liquid from the end portion to the center portion of the wick thus enabling the prevention of the occurrence of dry-out.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

In some embodiments, a vapor chamber (or thermal ground plane) is disclosed. The various embodiments, however, are not limited to the various configurations described in this document, and the various embodiments or inventions may be applicable with suitable modification within a scope where the gist of the disclosed embodiments of the present invention is not changed. Further, the embodiments or configurations obtained by combining two or more examples, embodiments, or configurations described in this document also fall within the scope of the present invention.

The respective embodiments described in this document are provided only as example embodiments. The various embodiments and configuration of embodiments described in the different embodiments can be partially replaced or combined with each other.

A vapor chamber according to the present invention is a vapor chamber including: a casing formed of a first sheet and a second sheet which face each other and whose outer peripheries are bonded to each other; a working liquid sealed in the casing; and a wick disposed on an inner wall surface of the first sheet or the second sheet, wherein a wall portion is disposed around the wick as viewed in a top plan view of an inside of the casing.

Figure 1:
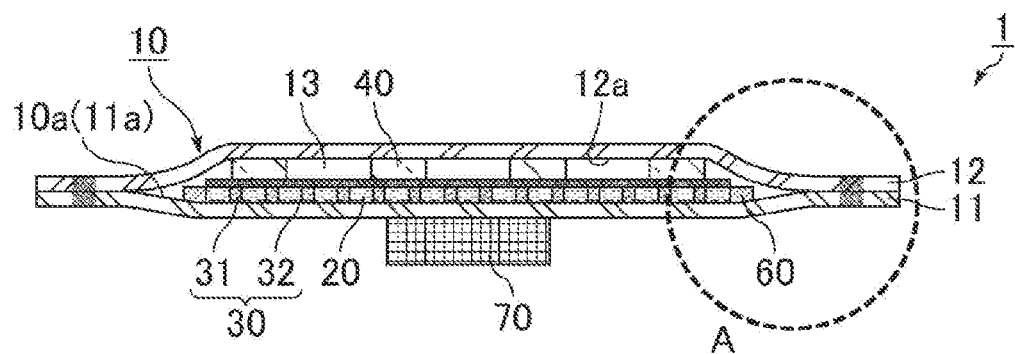
FIG. 1 a cross-sectional view schematically showing one example of the structure of a vapor chamber.

FIG. 1 is a cross-sectional view schematically showing one example of the structure of the vapor chamber according to some embodiments.

The vapor chamber 1 shown in FIG. 1 includes, for example: a casing 10 formed of a first sheet 11 and a second sheet 12 facing each other; a working liquid 20 sealed in the casing 10; a wick 30 disposed on an inner wall surface 11a of the first sheet 11; and a plurality of support columns 40 disposed on an inner wall surface 12a of the second sheet 12. A cavity 13 is formed in the casing 10

To ensure the cavity 13, the first sheet 11 and the second sheet 12 are supported by the support columns 40.

The first sheet 11 and the second sheet 12 are bonded and sealed to each other at outer edges of these sheets.

In the casing 10, the wick 30 is disposed on an inner wall surface 10a of the casing 10. The wick 30 is formed of: a plurality of protruding portions 31 disposed on the inner wall surface 11a of the first sheet 11 at a predetermined interval; and a mesh 32 disposed on the protruding portions 31.

The protruding portions 31 may be formed integrally with the first sheet 11. For example, the protruding portions 31 may be formed on the inner wall surface 11a of the first sheet 11 by etching or the like. In the same manner, the support columns 40 may be integrally formed with the second sheet 12. For example, the support columns 40 may be formed on the inner wall surface 12a of the second sheet 12 by etching or the like.

In some embodiments, the working liquid 20 may impregnate into the wick 30 in a liquid phase. In some embodiments, the working liquid 20 may exist in the cavity 13 in a gas phase (water vapor when the working liquid is water).

In some embodiments, a wall portion 60 may be disposed around the wick 30. The detail of the wall portion is described later.

In some embodiments, a heat generating member 70 may be disposed on an outer wall surface of the first sheet 11.

Due to heat of the heat generating member 70, some or all working liquid 20 existing in the wick 30 just above the heat generating member 70 may be vaporized, and/or the working liquid which takes heat from the heat generating member 70 and may be vaporized may move from the mesh 32 to the cavity 13.

In some embodiments, the vaporized working liquid moves in the casing 10 and/or is condensed in the vicinity of an outer edge of the casing 10 so that the working liquid becomes a liquid phase.

In some embodiments, the working liquid 20 in the liquid phase may move in the wick 30 via capillary action. In some embodiments, the working liquid 20 may move toward the heat generating member 70 in the wick 30. The working liquid 20 may remove work to remove heat from the heat generating member 70.

In some embodiments, as heat is transferred from the generating member 70 to the working liquid 20 and the working liquid 20 moves within the casing such as, for example, in a circulating manner, the heat generating member 70 may be cooled by the vapor chamber.

In some embodiments, the wall portion may be disposed around the wick 30 as viewed in a top plan view of the inside of the casing.

Figure 2A:
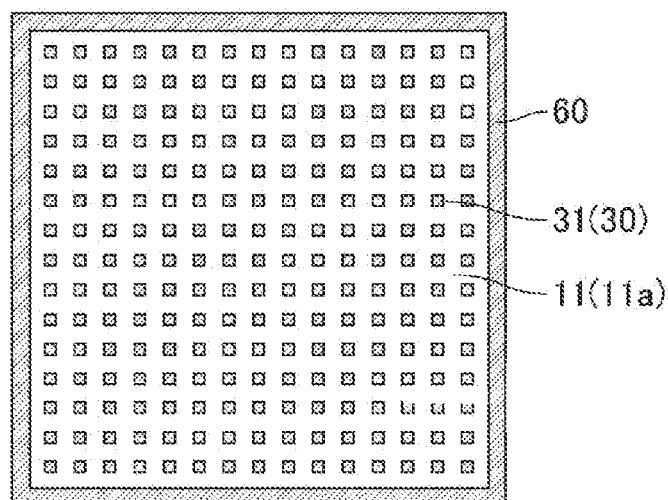
FIG. 2(a) and FIG. 2(b) are top plan views schematically showing the position of a wall portion disposed around a wick.
Figure 2B:
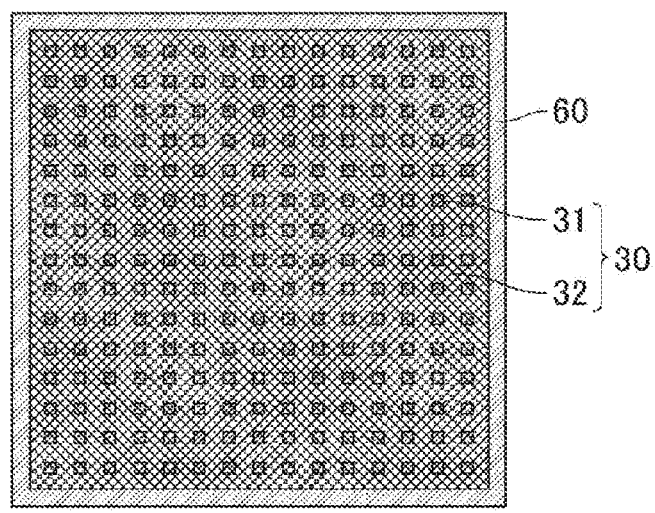

FIG. 2 (*a*) and FIG. 2 (*b*) are top plan views schematically showing the position of the wall portion 60 disposed around the wick 30 according to some embodiments.

In FIG. 2(*a*), the plurality of protruding portions 31 which form the wick 30 are shown. The protruding portions 31 are disposed on the inner wall surface 11*a* of the first sheet 11. Due to the formation of the plurality of protruding portions 31, the working liquid can be held between the protruding portions.

In some embodiments, the wall portion 60 may be disposed around the wick 30.

In some embodiments, the wall portion 60 may surround a periphery of the wick 30 such that a closed space is formed by the wall portion 60. It may not always be necessary, for example, that the whole periphery of the wick 30 be surrounded by the wall portion 60. In some embodiments, the wall portion 60 may surround only a part of the periphery of the wick 30.

In some embodiments, the wall portion 60 may surround the whole periphery of the wick 60 or a substantial amount of the whole periphery of the wick 30.

In some embodiments, the wall portion 60 may be integrally formed with the first sheet 11. For example, the wall portion 60 may be formed on the inner surface of the first sheet by etching or the like. In some embodiments, the wall portion may be formed simultaneously with the protruding portions 31 by etching.

In some embodiments, the wall portion 60 may be formed using the same material as the protruding portions 30. In some embodiments, the wall portion 60, the protruding portions 30, and the first sheet 11 may be formed using the same material.

In some embodiments, the height of the wall portion 60 may not be particularly limited. In some embodiments, the height of the wall portion may be 1 μm or more and/or 100 μm or less. In some embodiments, the height of the wall portion may be 5 μm or more and/or 50 μm or less. In some embodiments, the height of the wall portion may be 15 μm or more and/or 30 μm or less. In some embodiments, when the wick includes the protruding portions 31, for example, the height of the wall portion may be equal to a height of the protruding portions 31.

In some embodiments, such as, for example, where the wall portion and the protruding portions are simultaneously formed by etching, the height of the wall portion and the height of the protruding portions can be set equal to each other.

In some embodiments, a width of the wall portion (e.g., a width indicated by both arrows W in FIG. 2(*a*)) may not be particularly limited. In some embodiments, the width of the wall portion may be 10 μm or more and/or 5000 μm or less. In some embodiments, the width of the wall portion may be 50 μm or more and/or 200 μm or less. In some embodiments, the width of the wall portion may be 10 μm or more and/or 7000 μm or less. In some embodiments, the width of the wall portion may be 50 μm or more and/or 2000 μm or less. In some embodiments, the width of the wall portion may be 100 μm or more and/or 1000 μm or less.

In some embodiments, the wick may include a mesh disposed on a plurality of columnar protruding portions.

FIG. 2(*b*) shows a mesh 32 is disposed on the plurality of protruding portions 31 that form the wick 30. In some embodiments, the mesh 32 is not disposed on an upper surface of the wall portion 60. In some embodiments, the mesh 32 may have apertures of a size through which the vaporized working liquid and the liquefied working liquid can pass. For example, the mesh 32 may have apertures sizes of 0.10 μm or more to 50 μm or less.

The mesh, for example, may include a nonwoven fabric or a porous material.

Figure 3:
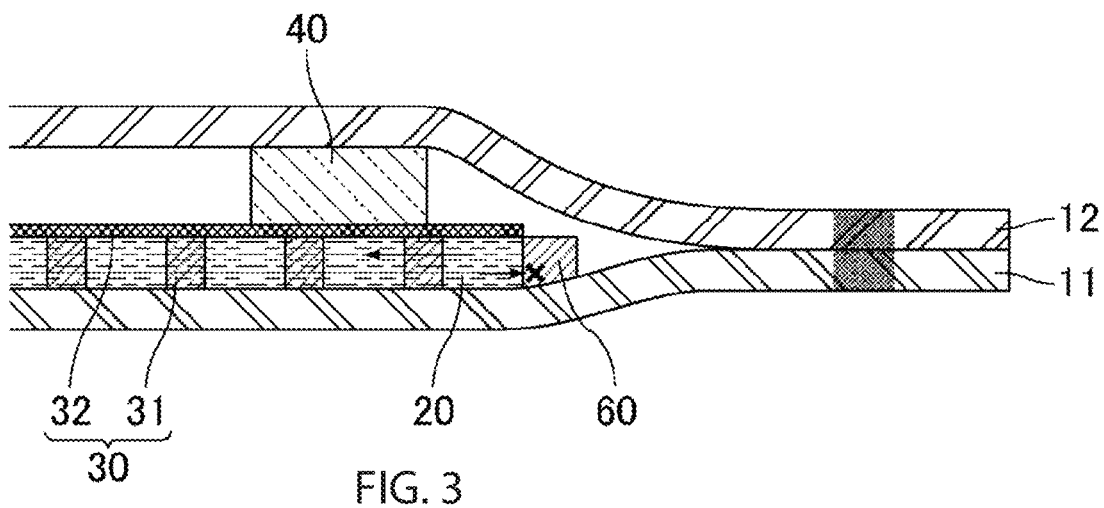
FIG. 3 is an enlarged cross-sectional view showing, in an enlarged manner, a region indicated by a broken line A in FIG. 1.

FIG. 3 is an enlarged cross-sectional view showing, in an enlarged manner, a region indicated by a broken line A in FIG. 1 according to some embodiments.

In some embodiments, with a provision of the wall portion 60 around the wick 30, in the case where the liquefied working liquid 20 exists at an end portion of the wick 30, it is possible to prevent the working liquid 20 from flowing to the outside of the wall portion 60 (indicated by X in FIG. 3), as well as to prevent the working vapor from flowing into the end portion of the wick 30. Accordingly, the direction along which the working liquid moves is controlled. For example, the working liquid may move toward the center portion of the wick and hence, the working liquid is continuously supplied to the center portion of the wick.

In some embodiments, a shape of an upper surface of the wall portion may have a shape that substantially conforms to a shape of the opposite inner wall surface of the second sheet at a portion of the second sheet which faces the wall portion.

Figure 4:
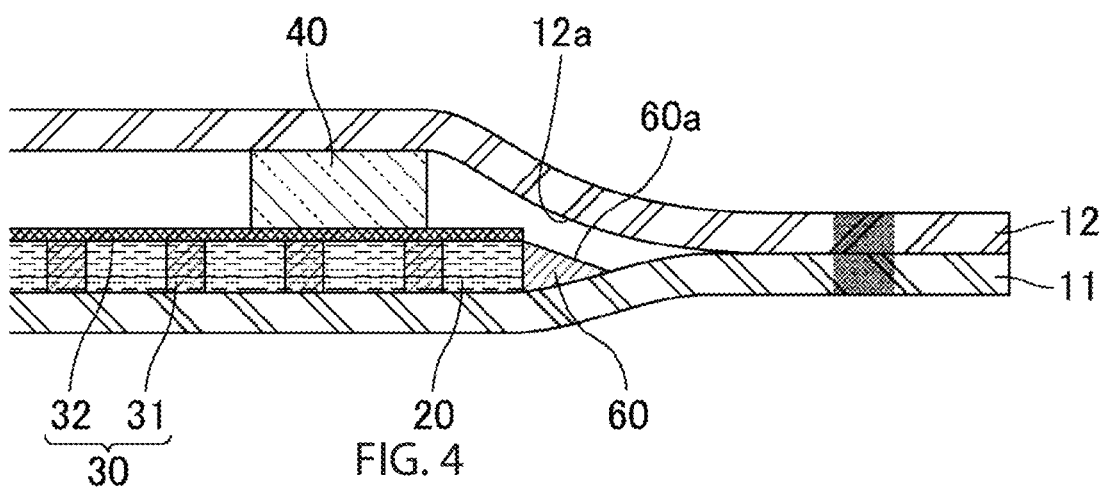
FIG. 4 is an enlarged cross-sectional view schematically showing the region in an example where the wall portion has a different shape.

FIG. 4 is an enlarged cross-sectional view schematically showing the region in an example where the wall portion has a different shape according to some embodiments. In FIG. 4, the upper surface 60*a* of the wall portion 60 faces the inner wall surface 12*a* of the second sheet 12.

The shape of the upper surface 60*a* of the wall portion 60, for example, may be the shape which substantially conforms to the shape of the inner wall surface 12*a* of the second sheet 12. For example, the shape of the upper surface 60*a* of the wall portion 60 may be substantially the shape inclined in conformity with the inclination of the inner wall surface 12*a* of the second sheet 12. Other configurations are equal to the corresponding configurations shown in FIG. 3 which is the enlarged cross-sectional view.

In some embodiments, by forming the upper surface shape of the wall portion into the shape which conforms to the shape of the inner wall surface of the second sheet that faces the wall portion (e.g., the opposite sheet), a volume of a space at an outer edge of the casing can be reduced. In some embodiments, In the case where a space is formed at the outer edge of the casing and the working liquid stagnates in the space, an amount of working liquid which circulates in the casing is decreased. In some embodiments, the volume of the space at the outer edge of the casing may be small such as, for example, less than about 0.05, 0.025, 0.01, 0.005 mL, etc. As another example, the volume of the space at the outer edge of the casing may be less than about 5%, 2.5%, 1%, 0.5%, etc. of the interior volume of the vapor core.

In some embodiments, by forming the shape of the upper surface of the wall portion into the shape which conforms to the shape of the inner wall surface of the second sheet at the portion of the second sheet which faces the wall portion, the volume of the space at the outer edge of the casing can be reduced.

In some embodiments, the upper surface of the wall portion may be inclined. With such a configuration, for example, the working liquid can reach the wick by climbing the upper surface of the wall portion.

Figure 5:
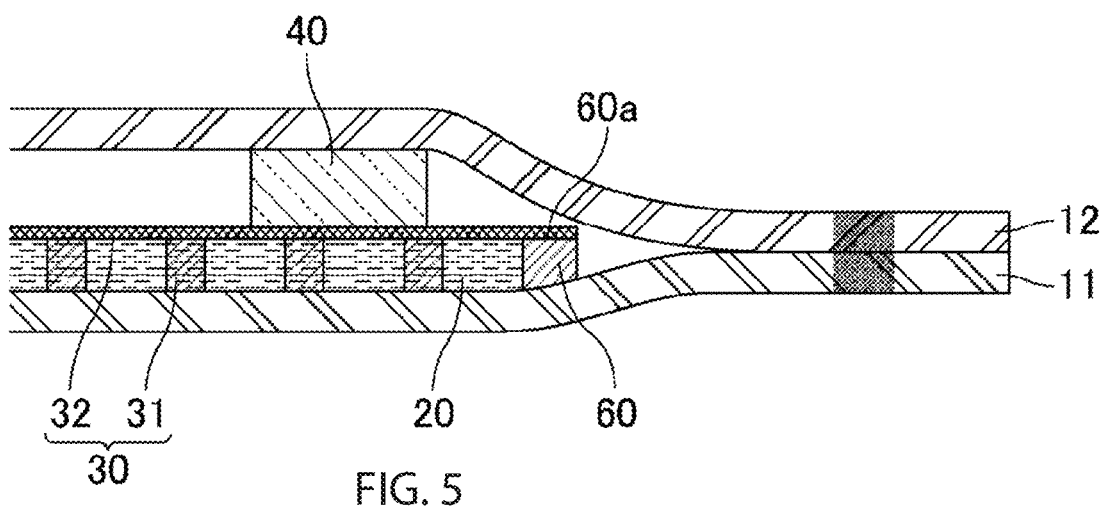
FIG. 5 is an enlarged cross-sectional view schematically showing the region in an example where a mesh is disposed on an upper surface of the wall portion.

In some embodiments, the mesh may be disposed on the upper surface of the wall portion. FIG. 5 is an enlarged cross-sectional view schematically showing the region in an example where a mesh is disposed on the upper surface of the wall portion according to some embodiments. As shown in FIG. 5, the mesh 32 is disposed also on the upper surface 60a of the wall portion 60.

Other configurations are equal to the corresponding configurations shown in FIG. 3 which is the enlarged cross-sectional view.

In some embodiments, with the mesh also on the upper surface of the wall portion, the working liquid existing at the outer edge of the casing and/or outside the wall portion can be absorbed by the mesh on the wall portion and/or can be returned to the center portion of the wick by capillary action.

In some embodiments, the circulation or flow of the working liquid can be enhanced by disposing the mesh on the upper surface of the wall portion.

Figure 6:
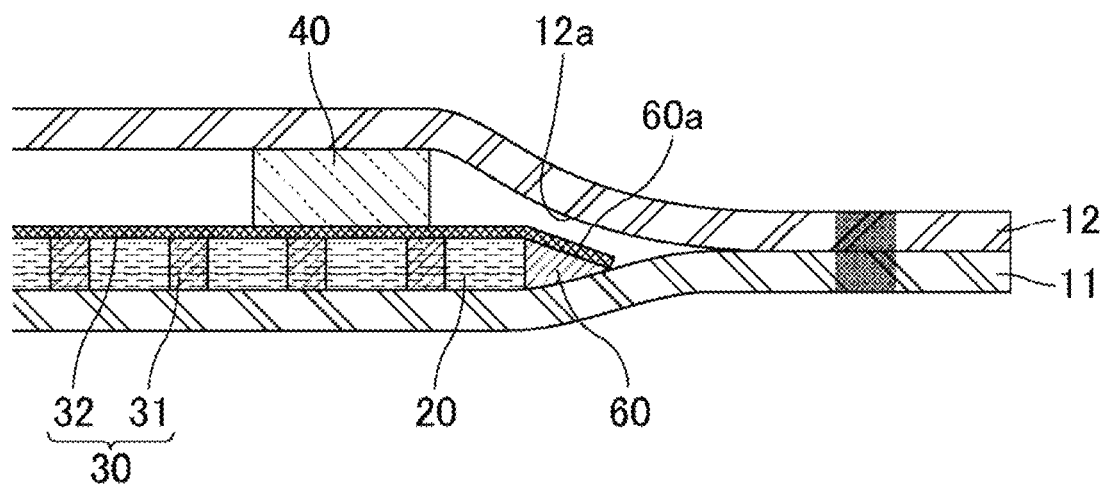
FIG. 6 is an enlarged cross-sectional view schematically showing the region in another example where a mesh is disposed on the upper surface of the wall portion.

FIG. 6 is an enlarged cross-sectional view schematically showing the region in another example where a mesh is disposed on the upper surface of the wall portion according to some embodiments.

In some embodiments, as shown in the configuration shown in FIG. 6, the upper surface 60a of the wall portion 60 is inclined such that a shape of the upper surface of the wall portion 60 is formed into a shape which conforms to a shape of the inner wall surface 12a of the second sheet 12 which faces the upper surface 60a of the wall portion 60, and the mesh 32 is disposed on the upper surface 60a of the wall portion 60.

With such a configuration, in some embodiments, a volume of a space at the outer edge of the casing can be reduced. In some embodiments, the working liquid can more easily climb the upper surface of the wall portion and/or the circulation property of the working liquid can be further enhanced.

The material comprising the wall portion is not limited. For example, the wall portion may be made of metal. The wall portion, for example, may be formed using a porous material. As another example, the wall portion may be formed using a porous material that has an aperture diameter equal to or smaller than an aperture of the mesh.

In some embodiments, the material comprising the wall portion may be a material that does not react with water. In some embodiments, the wall portion can be formed using a material having high heat resistance (for example, heat resistant temperature of 100° C. or more).

In some embodiments, the shape of the casing may not be particularly limited. In some embodiments, a planar shape (a shape as viewed from an upper side in the drawing in FIG. 1) of the casing may be a polygonal shape such as a triangular shape or a rectangular shape, a circular shape, an elliptical shape or a shape formed by combining these shapes, for example.

In some embodiments, the first sheet and the second sheet which form the casing may overlap with each other such that end portions of these sheets agree with each other or may overlap with each other such that the end portions of these sheets are displaced from each other.

In some embodiments, a material used for forming the first sheet and the second sheet may not be particularly limited provided that the material has a property suitable for being used for forming the vapor chamber, for example, thermal conductivity, strength or flexibility. In some embodiments, the material for forming the first sheet and/or the second sheet may be metal such as, for example, copper, nickel, aluminum, magnesium, titanium, iron, or an alloy which contains these metals as main components. In some embodiments, the material for forming the first sheet and/or the second sheet may be copper or a copper alloy.

In some embodiments, a material used for forming the first sheet and a material used for forming the second sheet may differ from each other. For example, by using a material having a high strength for forming the first sheet, a stress applied to the casing can be dispersed. Further, by making the materials of both sheets differ from each other, one function can be obtained by one sheet and another function can be obtained by the other sheet. Although the above-mentioned functions are not particularly limited, for example, a heat conductive function, an electromagnetic wave shield function and the like are named.

In some embodiments, thicknesses of the first sheet and the second sheet are not particularly limited. For example, when the first sheet and the second sheet are excessively thin, a strength of the casing may be lowered so that the casing may be deformed. In some embodiments, the thickness of the first sheet and/or the second sheet may be 20 μm or more. In some embodiments, the thicknesses of the first sheet and/or the second sheet may be each 30 μm or more.

On the other hand, when the first sheet and the second sheet become excessively thick, the reduction of the thickness of the entire vapor chamber may become difficult. In some embodiments, the thicknesses of the first sheet and/or the second sheet be each 200 μm or less. As another example, the thicknesses of the first sheet and/or the second sheet may be 150 μm or less. As another example, the thicknesses of the first sheet and the second sheet may be 100 μm or less. As another example, the thicknesses of the first sheet or the second sheet may be equal to each other or may differ from each other.

In some embodiments where the protruding portions which form the wick are integrally formed with the first sheet, the thickness of the first sheet may be determined by a thickness of a portion of the first sheet which is not brought into contact with the protruding portions. In some embodiments where the support columns are integrally formed with the second sheet, a thickness of the second sheet is determined by a thickness of a portion of the second sheet which is not brought into contact with the support column.

In some embodiments, the first sheet may have a fixed thickness. In some embodiments, the first sheet may have a large thickness portion and a small thickness portion. In some embodiments, the second sheet may have a fixed thickness. In some embodiments, the second sheet may have a large thickness portion and a small thickness portion. In some embodiments, portions of the second sheet that are not brought into contact with the support columns may be indented toward the inside of the casing.

In some embodiments, the working liquid may not be particularly limited. In some embodiments, the working liquid may generate a gas-liquid phase change under an atmosphere in the casing. For example, water, alcohol, alternative fluorocarbon or the like may be used as the working liquid. The alternative fluorocarbon, for example, may follows the list established by the US Environmental Protection Agency (EPA). In some embodiments, the working liquid be an aqueous compound. In some embodiments, the working liquid be water.

In some embodiments, the wick may not be particularly limited. In some embodiments, the wick may have a capillary structure that can move the working liquid due to capillary action. The capillary structure of the wick, for example, may adopt the known structure used in conventional vapor chambers. In some embodiments, micro fine structures having unevenness such as fine pores, grooves, or protrusions can be used for capillary structure. For example, a porous structure, a fibrous structure, a groove structure, a net structure, etc. may be used as the capillary structure.

In some embodiments, the wick may be continuously disposed between a vaporizing portion (e.g., an evaporator) to a condensing portion (e.g., a condenser) in the casing. In some embodiments, at least a portion of the wick may be integrally formed with the casing.

In some embodiments, the wick may include a plurality of protruding portions on the inner wall surface of the first sheet. The working liquid, for example can be maintained between the protruding portions and/or the heat transfer ability of the vapor chamber can be enhanced.

The protruding portion, for example, means a portion having a greater height compared to a height of the surrounding area. The protruding portion, for example, can include a portion having a greater height compared to the surrounding due to recessed portions in the surrounding area such as grooves formed on the inner wall surface. The protruding portion, for example, can include portions protruding from the inner wall surface.

In some embodiments, where the wick may include the protruding portions. The height of the protruding portions may not be particularly limited. In some embodiments, the height of the protruding portions be 1 µm or more to 100 µm or less. In some embodiments, the height of the protruding portions be 5 µm or more to 50 µm or less. In some embodiments, the height of the protruding portions be 15 µm or more to 35 µm or less.

In some embodiments, by setting the height of the protruding portions greater than the height of the surrounding, a retention amount of the working liquid can be further increased. In some embodiments, by further lowering the height of the protruding portions, it is possible to ensure the larger cavity in which vapor of the working liquid moves.

In some embodiments, the ability of the vapor chamber to transfer heat and/or the thermal diffusion of the vapor chamber can be adjusted by adjusting the height of the protruding portions.

In some embodiments, a distance between the protruding portions may not be particularly limited. In some embodiments, the distance between the protruding portions be 1 µm or more to 500 µm or less. In some embodiments, the distance between the protruding portions be 5 µm or more to 300 µm or less. In some embodiments, the distance between the protruding portions be 15 µm or more to 200 µm or less. In some embodiments, by decreasing the distance between the protruding portions, capillarity can be further increased. By increasing the distance between the protruding portions, for example, the permeability of the vapor chamber can be increased. With the increase of permeability of the vapor chamber, for example, the heat chambers ability to transfer heat may be increased.

In some embodiments, the shape of the protruding portions may not be particularly limited. In some embodiments, the protruding portion may include a circular columnar shape, an angular columnar shape, a circular frustoconical shape, an angular frustoconical shape or the like.

In some embodiments, the protruding portions may be arranged in a pattern. The pattern may include any type of pattern such as, for example, a rectangular array of protruding portions parallel to the wall 60; a rectangular array of protruding portions at an angle (e.g., 45-degree offset from the wall); a hexagonal array of protruding portions; a radial array (e.g., a spiral array), etc. The protruding portions have at least a regular arrangement pattern or a non-regular arrangement pattern.

In some embodiments, the wick may include a mesh, a nonwoven fabric, or a porous material on a surface of the first sheet on a side opposite to the inner wall surface. For example, the wick may be formed of a plurality of protruding portions disposed on an inner wall surface of a first sheet at a predetermined interval, and/or a high capillary force member such as a mesh, a nonwoven fabric, or a porous material disposed on the protruding portions. As another example, the wick may be formed of a mesh, a nonwoven fabric, or a porous material directly disposed on an inner wall surface of a first sheet.

In some embodiments, the wick may include a mesh disposed on the plurality of protruding portions. The mesh may have an aperture size of 0.01 µm or more to 50 µm or less.

In some embodiments, when the size of the aperture of the mesh is small, ingress of vapor into the wick along a reverse flow of the working liquid that flows toward an end portion of the wick may occur. This may occur even though the capillary action may be increased due to the smallness of the mesh aperture size. In some embodiments, the wall portion may be disposed around the wick, which may alleviate or eliminate a reverse flow of vapor into the wick.

With respect to a relationship between a size of the aperture of the mesh and a height of the protruding portions, when the height of the protruding portions is greater than a diameter of the aperture of the mesh, an ingress of the working vapor into a reverse flow of the working liquid that flows toward the end portion of the wick may occur. In some embodiments, the wall portion may be disposed around the wick and hence, a drawback which arises due to such a reverse flow of the working liquid vapor can be eliminated.

That is, the configuration of the vapor chamber according to the present invention is suitably applicable to the case where a height of the protruding portions is greater than a diameter of the aperture of the mesh with respect to a relationship between the size of the aperture of the mesh and the height of the protruding portions.

In some embodiments, the support columns may support the first sheet and the second sheet from the inside. Because the support columns are disposed in the casing, the support columns may suppress the deformation of the casing even when a pressure in the casing is decreased and/or an external pressure is applied to the casing from the outside of the casing or the like. The support columns, for example, may support the first sheet or the second sheet in a directly contacting manner, or may support the first sheet or the second sheet by way of other members such as the wick, for example.

In some embodiments, the shape of the support column may not be particularly limited. For example, the support column may have a circular columnar shape, an angular columnar shape, a circular frustoconical shape, an angular frustoconical shape, etc.

In some embodiments, the arrangement of the support columns may not be particularly limited. For example, the support columns may be uniformly arranged. As another example, the support columns may be arranged in a lattice point manner such that a distance between the support columns has a fixed value. By arranging the support columns uniformly, for example, the vapor chamber can ensure a uniform strength over the entire structure.

The vapor chamber according to the present invention is not limited to the above-mentioned embodiments, and various modifications and changes can be made within the scope of the present invention with respect to the configuration, manufacturing conditions and the like of the vapor chamber.

For example, the wick may be disposed on the inner wall surface of the second sheet of the vapor chamber. The support columns, for example, may support the second sheet by way of the wick without being directly brought into contact with the second sheet.

In some embodiments, the ability of the vapor chamber to transfer heat and/or the thermal diffusion of the vapor chamber may allow the vapor chamber to be used as a heat radiating device.

The various embodiments and examples of vapor chambers disclosed in this document may allow for downsizing, such as, for example, the reduction of the thickness of the vapor chamber. For example, the vapor chamber may be used within a device where downsizing is requested, for example, an electronic device.

In some embodiments, a method of manufacturing a vapor chamber may not be particularly limited. For example, the above-mentioned configuration can be obtained in such a manner where the first sheet on which the wall portion is disposed around the wick and the second sheet on which the support columns are disposed are made to overlap with each other, the first sheet and the second sheet may be bonded to each other while leaving an opening portion for filling the working liquid, and the working liquid may be filled in the casing through the opening portion, and the opening portion may be sealed.

In some embodiments, the bonding method of the first sheet and the second sheet may not be particularly limited. For example, the first sheet and the second sheet may be bonded using laser welding, resistance welding, diffusion bonding, brazing, tungsten inert gas (TIG) welding, ultrasonic bonding, resin sealing or the like.

In some embodiments, the method of arranging the wall portion around the wick may not be particularly limited. For example, a metal sheet may be used as the first sheet, and the plurality of protruding portions and the wall portion may be simultaneously or substantially simultaneously formed by etching the metal sheet.

In some embodiments, to obtain the structure where the wall portion is disposed around the wick, the mesh may be placed on the plurality of protruding portions after the plurality of protruding portions and the wall portion are formed.

Hereinafter, an example of steps of manufacturing the wick and the wall portion is described with reference to drawings.

Figure 7:
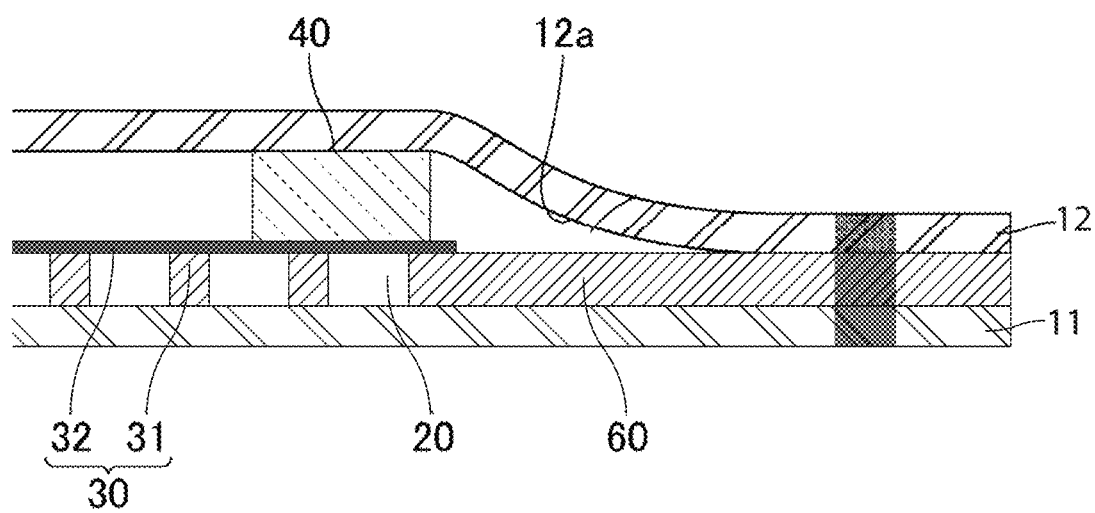
FIG. 7 is an enlarged cross-sectional view schematically showing the region in an example where the wall portion is extended to edge of the vapor chamber.

FIG. 7 is an enlarged cross-sectional view schematically showing the region in an example where the wall portion has a different shape.

In FIG. 4, the wall 60 exists near the edge of the vapor chamber. That is, the wall 60 is extended to a point where the sheet 11 and the sheet 12 face each other such as, for example, where the sheet 11 and the sheet 12 are sheet 12 are bonded.

In some embodiments, extending the wall 60 to the edge of sheet 11 and/or sheet 12, the rigidity of the buttock portion of the vapor chamber may be increased and/or the vapor chamber may become difficult to bend.

In some embodiments, the width of the wall 60 may be 1 mm or more and/or 10 mm or less. In some embodiments, the wall 60 may be integrated with the sheet 11. The integration, for example, may increase the rigidity and/or may reduce the number of parts and facilitates assembly.

In some embodiments, the mesh 32 may or may not overlie the wall 60 as shown in FIG. 4.

In some embodiments, at least one or all of the support columns 40 may overlap the wall 60.

By arranging the support column 40 so as to overlap the wall 60, the rigidity in the vertical direction is more reliably increased, and it becomes easy to secure a space. Also, the support column 40 may be disposed at a position not overlapping the wall 60. In that case, more steam space can be secured, and the characteristics of vapor chamber increase. FIG. 7 is a cross-sectional view of the embodiment.

FIG. 8(a), FIG. 8(b), FIG. 8(c), and FIG. 8(d) are cross-sectional views schematically showing examples of steps that may be used to manufacture the wick and the wall portion.

Figure 8A:
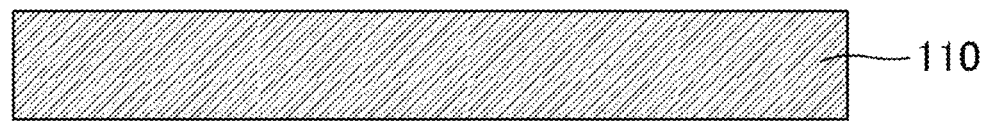
FIG. 8(a), FIG. 8(b), FIG. 8(c), and FIG. 8(d) are cross-sectional views schematically showing one example of steps of manufacturing the wick and the wall portion.

Firstly, as shown in FIG. 8(a), a sheet 110 is prepared. The sheet 110, for example, may comprise metal and/or have a thickness greater than a sum of a thickness of the first sheet and a thickness of the protruding portions of the vapor chamber.

Figure 8B:
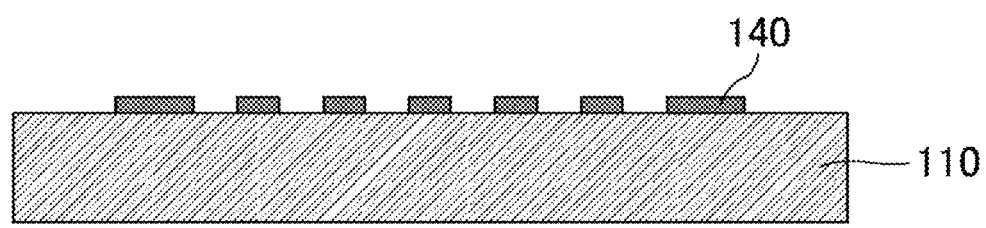

Then, as shown in FIG. 8(b), an etching resist 140 may be formed on the sheet 110 by a technique such as printing or exposure-development or the like. Positions at which the etching resist 140 is formed are positions where the protruding portions and/or the wall portion are to be formed.

Figure 8C:
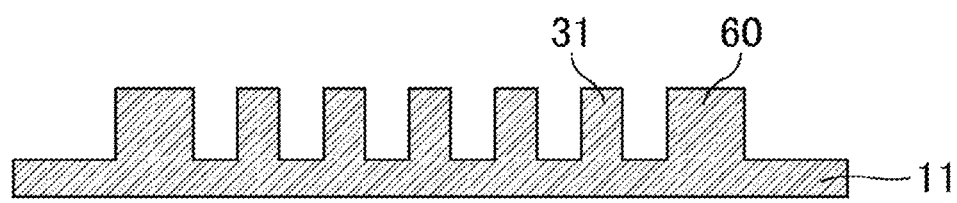
Figure 8D:
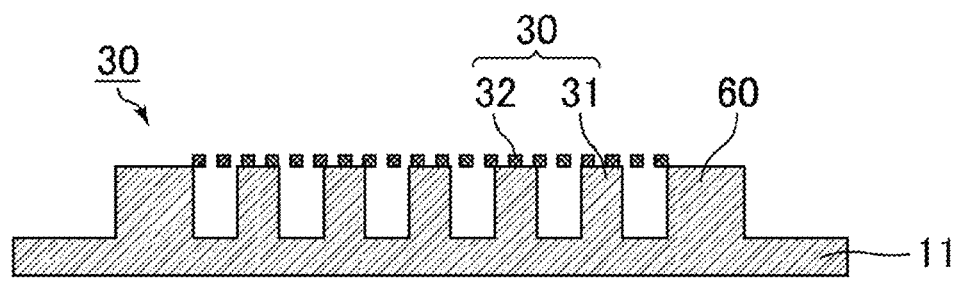

Then, as shown in FIG. 8(c), by applying etching to the sheet 110 and by peeling off the etching resist, the protruding portions 31 and the wall portion 60 remain at portions to which etching is not applied. Etching may be performed such that the sheet 110 having a thickness equal to a thickness of the first sheet 11 remains by adjusting an etching depth.

The mesh 32 may be placed on the protruding portions 31. The mesh 32 and the protruding portions 31, for example, may be bonded to each other by welding, plating or the like or the mesh 32 and the protruding portions 31 may be adhered to each other using an adhesive agent.

Using these steps, for example, embodiments where the wick 30 and the wall portion 60 are disposed on the inner wall surface of the first sheet 11 can be created.

Alternatively, the plurality of protruding portions which form the wick, the mesh disposed on the plurality of protruding portions, and the wall portion may be integrally formed with each other.

FIG. 9(a), FIG. 9(b), FIG. 9(c), and FIG. 9(d) and FIG. 10(a), FIG. 10(b), FIG. 10(c), and FIG. 10(d) are cross-sectional views schematically showing another example of steps of manufacturing the wick and the wall portion.

Figure 9A:
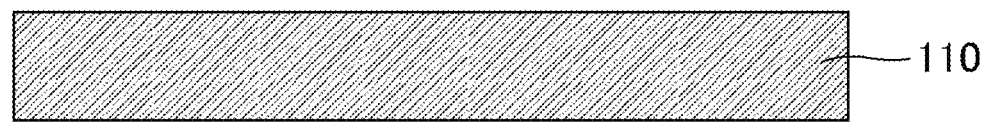
FIG. 9(a), FIG. 9(b), FIG. 9(c), and FIG. 9(d) are cross-sectional views schematically showing another example of steps of manufacturing the wick and the wall portion.

Firstly, as shown in FIG. 9(a), a sheet 110 which is an object to be etched may be prepared. The sheet 110, for example, may comprise metal and/or have a thickness greater than a sum of a thickness of the first sheet and a thickness of the protruding portions of the vapor chamber.

Figure 9B:
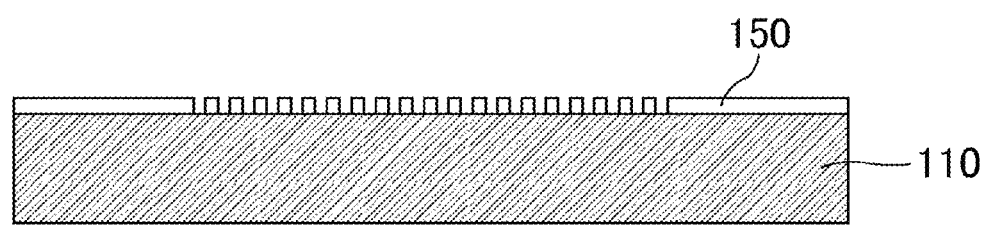

Subsequently, as shown in FIG. 9(b), a plating resist 150 is formed or placed on the sheet 110 by a technique such as printing, exposure-development or the like. The plating resist 150, for example, may be formed in conformity with the position (pattern) of the mesh to be formed.

Figure 9C:
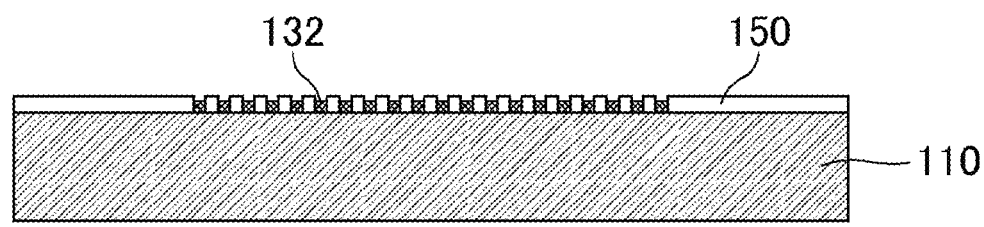

Then, as shown in FIG. 9(c), plating is applied to the sheet 110 so as to form another metal pattern 132 on the sheet 110. With respect to metal plating performed in this step, it may be necessary to perform such metal plating using a metal of a kind different from metal which forms the sheet 110. In some embodiments, copper may be used as metal for the sheet 110, and nickel plating, for example, may be used for the metal pattern 132.

Figure 9D:
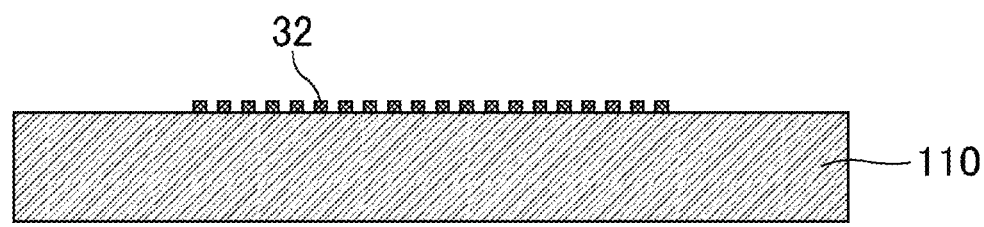

Then, as shown in FIG. 9(d), the plating resist may be peeled off so that the pattern of the mesh 32 can remains on the sheet 110. The mesh obtained in this step, for example, may not have longitudinal lines or lateral lines that intersect with each other. The mesh may be a lattice-like mesh where longitudinal lines and lateral lines do not intersect with each other.

Figure 10A:
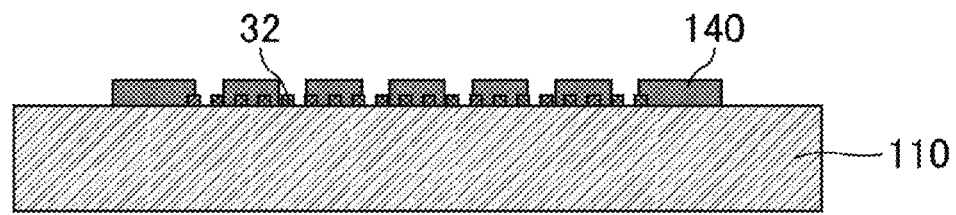
FIG. 10(a), FIG. 10(b), FIG. 10(c), and FIG. 10(d) are cross-sectional views schematically showing another example of steps of manufacturing the wick and the wall portion.

Then, as shown in FIG. 10(a), an etching resist 140 may be formed on the sheet 110 and the mesh 32 by a technique such as printing or exposure-development. The positions where the etching resist 140 is formed may be the positions where the protruding portions and/or the wall portion are to be formed.

Figure 10B:
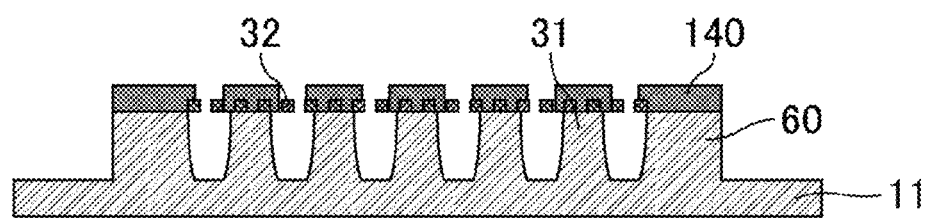
Figure 10C:
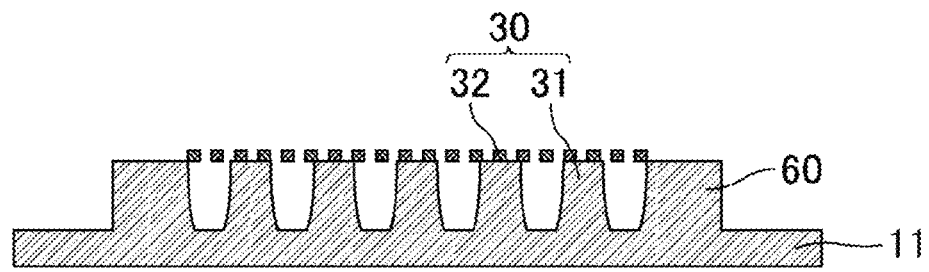

Then, as shown in FIG. 10(b), etching may be applied to the sheet 110, and as shown in FIG. 10(c), the etching resist may be peeled off. As a result, the protruding portions 31 and the wall portion 60 can remain at portions where the etching is not applied. In some embodiments, the etching may be performed using a chemical etchant by which metal forming the sheet 110 is etched and metal forming the mesh 32 is not etched.

With respect to the protruding portions 31 formed by etching, the protruding portions 31 can have a fine shape on a side of the mesh 32, and can have a bold tapered shape on a side opposite to the mesh 32 (a side of the first sheet 11).

In some embodiments, etching may be performed such that the metal sheet having a thickness equal to a thickness of the first sheet 11 remains by adjusting an etching depth or etching duration. This may, for example, control the height of the protruding portions 31 and/or the wall portion 60.

As shown in FIG. 10(c) the etching resist may be peeled off so that the pattern of the mesh 32 can remains on the sheet 110.

Figure 10D:
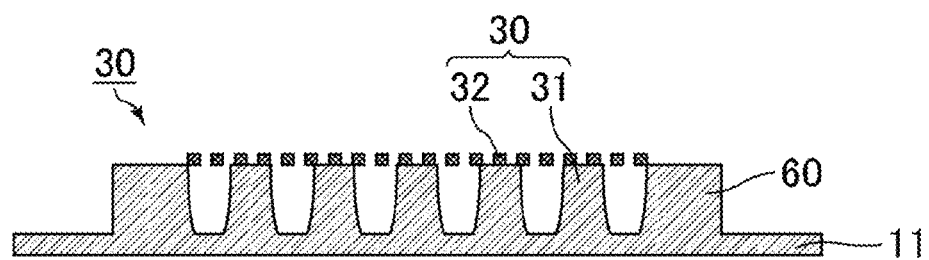

As shown in FIG. 10(d), when the thickness of the sheet 11 is large, the thickness of the first sheet may, for example, be adjusted by performing back surface polishing.

Using these steps, for example, embodiments where the plurality of protruding portions forming the wick, the mesh disposed on the plurality of the protruding portions, and the wall portion can be integrally formed with each other.

These steps can be also used, for example, in the manufacture of the vapor chamber having no wall portion. In this case, it is possible to obtain the configuration where the plurality of protruding portions forming the wick and the mesh disposed on the plurality of protruding portions are integrally formed with each other. Then, it may be possible to manufacture the vapor chamber provided with the wick having the configuration where the plurality of protruding portions and the mesh disposed on the plurality of protruding portions are integrally formed with each other.

DESCRIPTION OF REFERENCE SYMBOLS

1: vapor chamber
10: casing
10a: inner wall surface of casing
11: first sheet
11a: inner wall surface of first sheet
12: second sheet
12a: inner wall surface of second sheet
13: cavity
20: working liquid
30: wick
31: protruding portion
32: mesh
40: support column
60: wall portion
60a: upper surface of wall portion
70: heat generating member
110: metal sheet
132: metal pattern
140: etching resist
150: plating resist Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A vapor chamber comprising:
  a casing comprising:
    a first sheet having a first inner sheet surface, and a second sheet having a second inner sheet surface, the first inner sheet surface of the first sheet and the second inner sheet surface of the second sheet face each other, wherein the first sheet and the second sheet are bonded and sealed to each other at the outer edges to form a cavity;
  a working liquid sealed in the casing within the cavity, the working liquid comprising a fluorocarbon; and
  a nonwoven mesh having a plurality of apertures that is disposed on the first inner sheet surface of the first sheet within the cavity, wherein the apertures have a size of 0.10 μm to 50.

2. The vapor chamber according to claim 1, further comprising a plurality of columnar protruding portions disposed between the second sheet and the nonwoven mesh, wherein the nonwoven mesh is disposed on the protruding portions.

3. The vapor chamber according to claim 1, wherein the nonwoven mesh comprises a porous material or a nonwoven fabric.

4. The vapor chamber according to claim 2, wherein the protruding portions have a height of 1 μm or more to 100 μm or less.

5. The vapor chamber according to claim 1, further comprising a plurality of support columns disposed on the second inner sheet surface of the second sheet.

6. The vapor chamber according to claim 1, further comprising a cavity disposed between the wick and the second sheet.

7. A vapor chamber comprising:
a casing comprising:
a first sheet having a first inner sheet surface, and
a second sheet having a second inner sheet surface, the first inner sheet surface of the first sheet and the second inner sheet surface of the second sheet face each other, and
outer peripheries of the first sheet and the second sheet are bonded to each other,
wherein the first sheet and/or the second sheet has a thicknesses of 200 μm or less,
wherein the first sheet and the second sheet are bonded and sealed to each other at the outer edges to form a cavity;
a working liquid sealed in the cavity;
the working liquid comprising a fluorocarbon;
a plurality of protruding portions disposed on the first inner sheet surface; and
a nonwoven mesh having a plurality of apertures, the nonwoven mesh is disposed on the protruding portions within the cavity, wherein the apertures have a size of 0.10 μm to 50.

8. The vapor chamber according to claim 7, wherein further comprising a wall portion disposed on the first inner sheet surface of the first sheet, disposed within the cavity, and surrounding a periphery of the nonwoven mesh.

9. The vapor chamber according to claim 7, wherein the nonwoven mesh comprises a porous material or a nonwoven fabric.

10. The vapor chamber according to claim 7, wherein the plurality of protruding portions do not extend to the second sheet.

11. A vapor chamber comprising:
a casing comprising:
a first sheet having a first inner sheet surface, and
a second sheet having a second inner sheet surface,
the first inner sheet surface of the first sheet and the second inner sheet surface of the second sheet face each other, and
outer peripheries of the first sheet and the second sheet are bonded to each other,
wherein the first sheet and/or the second sheet has a thicknesses of 200 μm or less,
wherein the first sheet and the second sheet are bonded and sealed to each other at the outer edges to form a cavity;
a working liquid sealed in the cavity, the working liquid comprising a fluorocarbon;
a plurality of protruding portions disposed on the first inner sheet surface of the first sheet within the cavity;
a nonwoven mesh having a plurality of apertures, the nonwoven mesh disposed on the protruding portions within the cavity, wherein the nonwoven mesh includes apertures with a size of 0.10 μm to 50; and
a wall portion disposed on the first inner sheet surface of the first sheet, disposed within the cavity, and surrounding a periphery of the nonwoven mesh and wherein a portion of the nonwoven mesh is disposed on an upper surface of the wall portion.

12. The vapor chamber according to claim 11, wherein the nonwoven mesh comprises a porous material or a nonwoven fabric.

* * * * *